United States Patent
Tajimi et al.

(10) Patent No.: US 12,518,516 B2
(45) Date of Patent: Jan. 6, 2026

(54) RECOGNITION PROCESS EXECUTION PROGRAM AND RECOGNITION PROCESS EXECUTION DEVICE

(71) Applicant: MAXELL, LTD., Kyoto (JP)

(72) Inventors: Go Tajimi, Tokyo (JP); Takahiro Suzuki, Tokyo (JP)

(73) Assignee: MAXELL, LTD., Kyoto (JP)

( * ) Notice: Subject to any disclaimer, the term of this patent is extended or adjusted under 35 U.S.C. 154(b) by 375 days.

(21) Appl. No.: 18/022,341

(22) PCT Filed: Sep. 28, 2021

(86) PCT No.: PCT/JP2021/035499
§ 371 (c)(1),
(2) Date: Feb. 21, 2023

(87) PCT Pub. No.: WO2022/065504
PCT Pub. Date: Mar. 31, 2022

(65) Prior Publication Data
US 2023/0326190 A1    Oct. 12, 2023

(30) Foreign Application Priority Data
Sep. 28, 2020 (JP) ................. 2020-162189

(51) Int. Cl.
*G06V 10/776* (2022.01)
*G06V 10/20* (2022.01)

(52) U.S. Cl.
CPC .......... *G06V 10/776* (2022.01); *G06V 10/255* (2022.01)

(58) Field of Classification Search
CPC .... G06V 10/776; G06V 10/255; G06V 10/75; G06V 10/7747; G06V 10/82; G06V 2201/07; G06T 7/00
See application file for complete search history.

(56) References Cited

U.S. PATENT DOCUMENTS

2010/0177932 A1*  7/2010  Yano ................... G06F 18/2148
                                                     348/222.1
2019/0066333 A1*  2/2019  Furihata .................... G06T 7/77
(Continued)

FOREIGN PATENT DOCUMENTS

EP         3553700       10/2019
JP       2017139646       8/2017
(Continued)

OTHER PUBLICATIONS

PCT International Search Report (with English translation) for corresponding PCT Application No. PCT/JP2021/035499, mailed Dec. 21, 2021, 4 pages.

*Primary Examiner* — Kathleen M Broughton
(74) *Attorney, Agent, or Firm* — Dority & Manning, P.A.

(57) ABSTRACT

A recognition process execution program that inputs first image data indicating a first image to a first trained model, makes the first trained model execute a first recognition process for recognizing a target appearing in the first image, makes the first trained model output first reliability data indicating a reliability of a result of the first recognition process, determines a reliability indicated by the first reliability data, and based on a determination result by the determination function, inputs second image data indicating a second image different from the first image data to a second trained model, and makes the second trained model execute a second recognition process, having a processing load greater than or equal to a processing load of the first recognition process, for recognizing the target appearing in the first image and the second image.

13 Claims, 5 Drawing Sheets

(56) References Cited

U.S. PATENT DOCUMENTS

| | | | |
|---|---|---|---|
| 2019/0156157 A1* | 5/2019 | Saito | G06F 18/217 |
| 2020/0013190 A1* | 1/2020 | Li | G06V 10/82 |
| 2020/0042796 A1* | 2/2020 | Kim | G06V 10/764 |
| 2023/0053838 A1* | 2/2023 | Namiki | G06T 7/0004 |

FOREIGN PATENT DOCUMENTS

| | | | | |
|---|---|---|---|---|
| JP | 2019185787 | | 10/2019 | |
| JP | 2020020744 | | 2/2020 | |
| JP | 2020035443 | | 3/2020 | |
| WO | WO2020003992 | | 1/2020 | |
| WO | WO-2021166058 A1 * | | 8/2021 | G06T 7/0004 |
| WO | WO-2021176584 A1 * | | 9/2021 | G06V 20/70 |

* cited by examiner

RECOGNITION PROCESS EXECUTION PROGRAM AND RECOGNITION PROCESS EXECUTION DEVICE

TECHNICAL FIELD

The present invention relates to a recognition process execution program and a recognition process execution device. The present application is a US national phase application of International Patent Application No. PCT/JP2021/035499, filed on Sep. 28, 2021, which claims priority to Japanese Patent Application No. 2020-162189, filed on Sep. 28, 2020, the contents of which are incorporated herein by reference.

BACKGROUND ART

At present, artificial intelligence is becoming more widespread, and there is increasing interest in technologies for processing moving images in real time by using embedded devices in which convolutional neural networks (CNNs) and the like have been installed. However, since embedded devices are limited in terms of computational capacity, usable power and the like, they require some sort of improvement when using convolutional neural networks or the like with at least a certain level of performance. An example of an embedded device that has been improved in such a way is, for example, the image capture device disclosed in Patent Document 1.

This image capture device comprises a photometric sensor, estimating means, setting means, and image capturing means. The photometric sensor measures light in a field of view. The estimating means estimates a class of an image capture target in the field of view based on photometric data output by the photometric sensor. The setting means sets image capture conditions based on the estimated class. The image capturing means captures an image of the image capture target under the set image capture conditions.

CITATION LIST

Patent Documents

Patent Document 1 JP 2017-139646 A

SUMMARY OF INVENTION

Technical Problem

However, the image capture device mentioned above can sometimes set image capture conditions that cannot always be considered to be optimal for a convolutional neural network or the like having at least a certain level of performance. Additionally, the image capture device mentioned above often sets such set conditions, in particular, when executing a process for recognizing a target that is relatively small, appearing in an image with high resolution.

The present invention was made in consideration of the above-mentioned circumstances, and provides a recognition process execution program and a recognition process execution device that can make an embedded device execute higher-level processes, even with limited performance provided in the embedded device.

Solution to Problem

An embodiment of the present invention is a recognition process execution program that makes a computer implement a first recognition process execution function for inputting first image data indicating a first image to a first trained model, making the first trained model execute a first recognition process for recognizing a target appearing in the first image, and making the first trained model output first reliability data indicating a reliability of a result of the first recognition process; a determination function for determining a reliability indicated by the first reliability data; and a second recognition process execution function for, based on a determination result by the determination function, inputting second image data indicating a second image different from the first image data to a second trained model, and making the second trained model execute a second recognition process, having a processing load greater than or equal to a processing load of the first recognition process, for recognizing the target appearing in the first image and the second image.

Additionally, the above-mentioned recognition process execution program may be configured so that, if the determination function determines that the reliability indicated by the first reliability data is lower than a prescribed threshold value, then the second recognition process execution function inputs, to the second trained model, the second image data indicating the second image, in which the resolution of the first image has been made higher.

Additionally, the above-mentioned recognition process execution program may be configured so that the first recognition process execution function inputs multiple items of the first image data to the first trained model, makes the first trained model execute the first recognition process, and makes the first trained model output the first reliability data; and the determination function determines, regarding the first reliability data that is output, whether or not the reliability indicated by the first reliability data is lower than a prescribed threshold value.

Additionally, the above-mentioned recognition process execution program may be configured so that, if the determination function has determined that the reliability indicated by the first reliability data is lower than a prescribed threshold value more than a prescribed number of times, then the second recognition process execution function inputs the first image data to the second trained model, which is a trained model different from the first trained model.

Additionally, the above-mentioned recognition process execution program may be configured so that, if the determination function has determined that the reliability indicated by the first reliability data is lower than a prescribed threshold value more than a prescribed number of times, then the second recognition process execution function inputs the second image data to the second trained model, which is a trained model that is the same as the first trained model.

Additionally, the above-mentioned recognition process execution program may be configured so that, if the determination function has determined that the reliability indicated by the first reliability data is lower than a prescribed threshold value more than a prescribed number of times, then the second recognition process execution function inputs the second image data to the second trained model, which is a trained model different from the first trained model.

Additionally, the above-mentioned recognition process execution program may be configured so that, if the determination function has determined that the reliability indicated by the first reliability data is lower than a prescribed threshold value more than a prescribed number of times, then the computer is further made to implement a moving image adjustment function for reducing the number of the first images per unit time.

Additionally, the above-mentioned recognition process execution program may be configured so that, if the second recognition process execution function inputs the second image data to the second trained model, then the first recognition process execution function acquires and inputs, to the first trained model, base image data indicating a base image that is the first image serving as a basis for generating the second image on which the second recognition process is executed, makes the first trained model execute an additional recognition process for recognizing the target appearing in the base image, and makes the first trained model output additional reliability data indicating a reliability of a result of the additional recognition process; the determination function further determines, regarding the additional reliability data that is output, whether or not a reliability indicated by the additional reliability data satisfies a prescribed condition; and the computer is further made to execute a control function for stopping the second recognition process and the additional recognition process, and starting the first recognition process, if the reliability indicated by the additional reliability data has been determined to satisfy the prescribed condition more than a prescribed number of times since the second recognition process and the additional recognition process started.

Additionally, the above-mentioned recognition process execution program may be configured so that the computer is further made to implement a moving image adjustment function for reducing the number of the first images per unit time if the determination function has determined that the reliability indicated by the first reliability data is lower than a prescribed threshold value more than a prescribed number of times.

Additionally, the above-mentioned recognition process execution program may be configured so that, if the number of the first images per unit time is reduced and the reliability indicated by the additional reliability data has been determined to satisfy the prescribed condition more than a prescribed number of times since the second recognition process and the additional recognition process started, then the moving image adjustment function increases the number of the first images per unit time.

Additionally, the above-mentioned recognition process execution program may be configured so that the second recognition process execution function makes the second trained model output second reliability data indicating a reliability of a result of the second recognition process; and the determination function determines whether or not a difference between the reliability indicated by the second reliability data and the reliability indicated by the additional reliability data is less than a prescribed threshold value.

Additionally, the above-mentioned recognition process execution program may be configured so that the first recognition process execution function makes the first trained model output the first reliability data indicating at least one of a reliability of a label appended to the target appearing in the first image, and a reliability of a size and a position of a first shape designating the target appearing in the first image.

An embodiment of the present invention is a recognition process execution device provided with a first recognition process execution unit that inputs first image data indicating a first image to a first trained model, makes the first trained model execute a first recognition process for recognizing a target appearing in the first image, and makes the first trained model output first reliability data indicating a reliability of a result of the first recognition process; a determination unit that determines a reliability indicated by the first reliability data; and a second recognition process execution unit that, based on a determination result by the determination unit, inputs second image data indicating a second image different from the first image data to a second trained model, and makes the second trained model execute a second recognition process, having a processing load greater than or equal to a processing load of the first recognition process, for recognizing the target appearing in the first image and the second image.

According to the present invention, an embedded device can be made to execute higher-level processes, even with limited performance provided in the embedded device.

DESCRIPTION OF EMBODIMENTS

Embodiments

Figure 1:
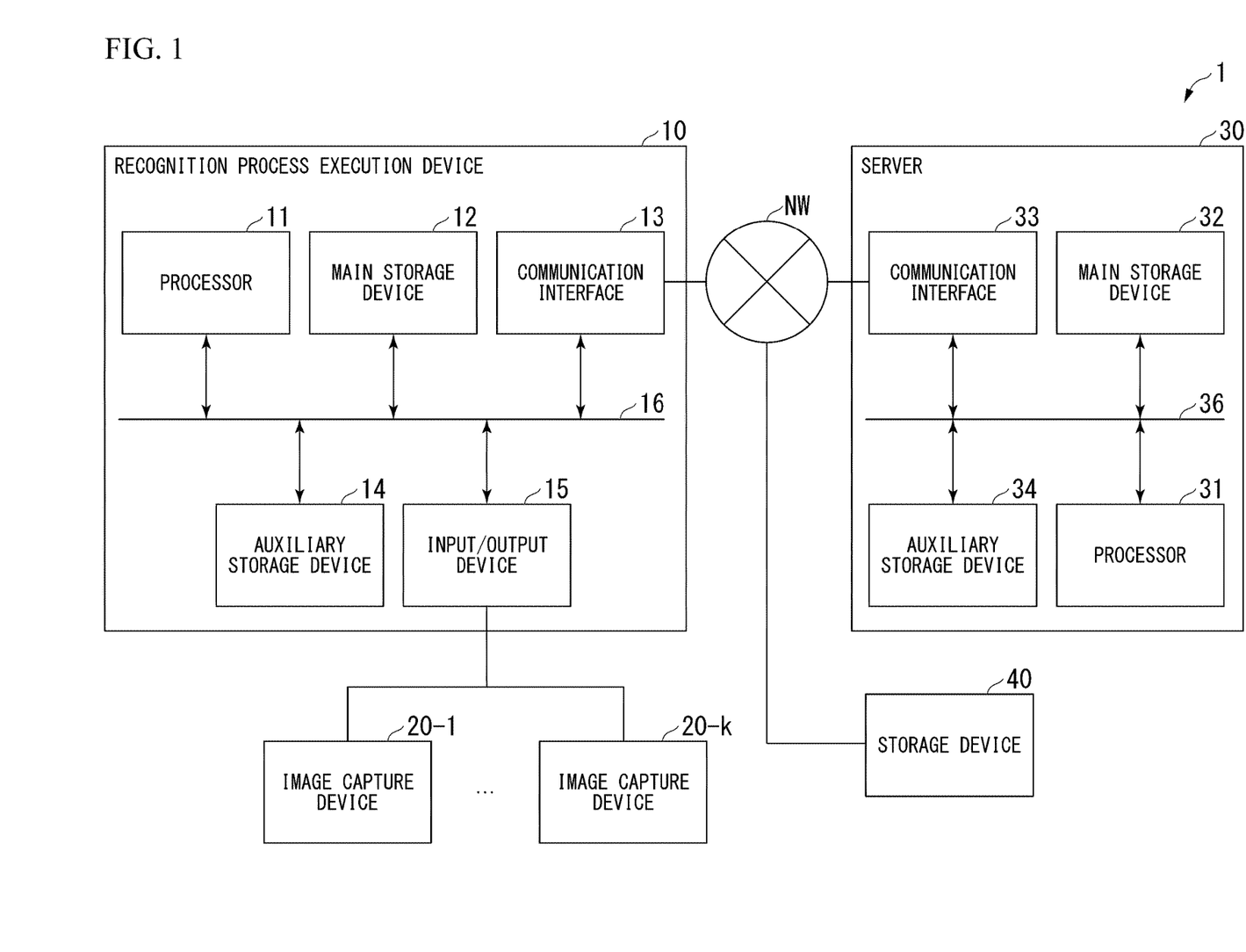
FIG. 1 is a diagram depicting an example of a recognition process execution system according to an embodiment.

First, the recognition process execution system according to an embodiment will be explained with reference to FIG. 1. FIG. 1 is a diagram depicting an example of a recognition process execution system. The recognition process execution system 1, as depicted in FIG. 1, is provided with a recognition process execution device 10, an image capture device 20-1, . . . , and an image capture device 20-k (where k is an integer greater than or equal to 1), a server 30, and a storage device 40.

As depicted in FIG. 1, the recognition process execution device 10 is an embedded device such as a drive recorder, a monitoring device used for security, or the like. Additionally, the recognition process execution device 10 is provided with a processor 11, a main storage device 12, a communication interface 13, an auxiliary storage device 14, an input/output device 15, and a bus 16.

While an edge device in which the recognition process execution device 10 is provided is contemplated as being a device that is driven by a battery or the like, as in communication equipment such as a mobile phone, a smart device such as a personal computer, a digital camera, a game device, or a mobile device in a robot product or the like, the edge device is not limited thereto. Effects not obtained by other prior examples can be obtained by utilization in a product for which there is a high demand for long-term driving, for reducing product heat generation, or for restricting the peak electric power that can be supplied by Power over Ethernet (PoE) or the like. For example, by applying the invention to a camera mounted on a vehicle, a ship, or the like, or to a security camera or the like provided in a public facility, on a road, or the like, not only can long-term image capture be realized, but also, the invention can contribute to weight reduction and higher durability. Additionally, similar effects can be achieved by applying the invention to a display device such as a television or a monitor, to medical equipment such as a medical camera or a surgical robot, or to a working robot or the like used at a production site or at a construction site.

The processor 11 is, for example, a CPU (Central Processing Unit) that reads out and executes a recognition process execution program 100 to be explained below to implement the respective functions of the recognition process execution program 100. Additionally, the processor 11 may read out and execute programs other than the recognition process execution program 100 to implement functions necessary for implementing the respective functions of the recognition process execution program 100. Furthermore, the processor 11 may be configured not only to control the entire recognition process execution device 10, but also to control at least one of the image capture device 20-1, . . . , and the image capture device 20-$k$.

The main storage device 12 is, for example, a RAM (Random Access Memory) in which the recognition process execution program 100 and other programs to be read out and executed by the processor 11 are prestored.

The communication interface 13 is an interface circuit for communicating with the server 30 or the storage device 40 via the communication network NW depicted in FIG. 1. Additionally, the communication network NW is, for example, a WAN (Wide Area Network), a LAN (Local Area Network), the internet, or an intranet. The communication interface 13 is used, for example, when transmitting data output or generated by the recognition process execution program 100 to the storage device 40 for the purpose of conserving the capacity of at least one of the main storage device 12 and the auxiliary storage device 14 installed in the recognition process execution device 10.

The auxiliary storage device 14 is, for example, an HDD (Hard-Disk Drive), an SSD (Solid-State Drive), a flash memory, or a ROM (Read-Only Memory). The auxiliary storage device 14 stores, for example, data required by the recognition process execution program 100, data output or generated by the recognition process execution program 100, data for communicating with the server 30 or the storage device 40, and the like.

The input/output device 15 is, for example, an input/output port. The input/output device 15 is connected, for example, with an image capture device, an input device, or an output device.

The image capture devices are, for example, the image capture device 20-1, . . . , and the image capture device 20-$k$ depicted in FIG. 1. The image capture device 20-1, . . . , and the image capture device 20-$k$ may have resolutions or angles of view that are different from each other. Additionally, at least one of the image capture device 20-1, . . . , and the image capture device 20-$k$ may not be connected. In the case in which multiple image capture devices are provided, multiple image capture devices may be virtually provided by cutting out partial angles of view from an image capture device provided with a wide-angle lens or the like. The input device is, for example, a mouse, a keyboard, a switch, a touch panel, or a smartphone. Additionally, the smartphone mentioned here may be usable as a remote control for operating the recognition process execution device 10. The input device is used to input, for example, instructions to change settings relating to image acquisition, instructions to start or stop capturing images, instructions to start or stop communicating with the server 30 or the like, and instructions to change various settings relating to the image capture devices or the recognition process execution device 10. Additionally, the settings relating to the acquisition of images mentioned here include, for example, settings and the like relating to the resolutions of images, the frame rates of moving images, and the compression rates of images. The output device is, for example, a display or a speaker.

The bus 16 connects the processor 11, the main storage device 12, the communication interface 13, the auxiliary storage device 14, and the input/output device so as to be able to transmit and receive data with respect to each other. In the present embodiment, an example in which multiple image capture devices 20-1, . . . , and 20-$k$ are connected to the recognition process execution device 10 was described. However, the embodiment is not limited thereto, and for example, a recognition process execution device 10 may be provided internally for each image capture device, or multiple recognition process execution devices 10 may be network-connected by communication devices such as routers. Additionally, in the case in which there is no need for real-time processing, a server or a memory that is a storage device for storing images output from an image capture device may be used as the input.

As depicted in FIG. 1, the server 30 is provided with a processor 31, a main storage device 32, a communication interface 33, an auxiliary storage device 34, and a bus 36.

The processor 31 is, for example, a CPU that reads out and executes a program 100 necessary for running the server 30. The main storage device 32 is, for example, a RAM in which programs to be read out and executed by the processor 31 are prestored. The communication interface 33 is an interface circuit for communicating with the recognition process execution device 10 or the storage device 40 via the communication network NW depicted in FIG. 1. The auxiliary storage device 14 is, for example, a hard-disk drive, a solid-state drive, a flash memory, or a ROM. The bus 16 connects the processor 31, the main storage device 32, the communication interface 13, and the auxiliary storage device 14 so as to be able to transmit and receive data with respect to each other.

For example, the server 30 uses data generated by the recognition process execution device 10 to execute processes different from or processes in addition to those of the recognition process execution device 10. As an example, it executes recognition processes such as object recognition and semantic segmentation, noise reduction processes or sharpening processes on images acquired by the respective image capture devices, or the like. Additionally, for example, the server 30 communicates to transmit, to the recognition process execution device 10, update files used for the purpose of updating programs installed in the recognition process execution device 10 itself. Additionally, for example, the server 30 transmits, to the recognition process execution device 10, non-image-related data used for at least one of a first recognition process, a second recognition process, and an additional recognition process, which will be explained below. Such data include, for example, data indicating results of identification of the current position of the recognition process execution device 10 by GPS (Global Positioning System), data indicating the distance between an automobile equipped with the recognition process execution device 10 and another automobile, data indicating the weather, data indicating the time, data indicating congestion information, data used for automatically identifying vehicles or ships, and the like.

The storage device 40 is, for example, a device for storing data output or generated by the recognition process execution device 10.

Figure 2:
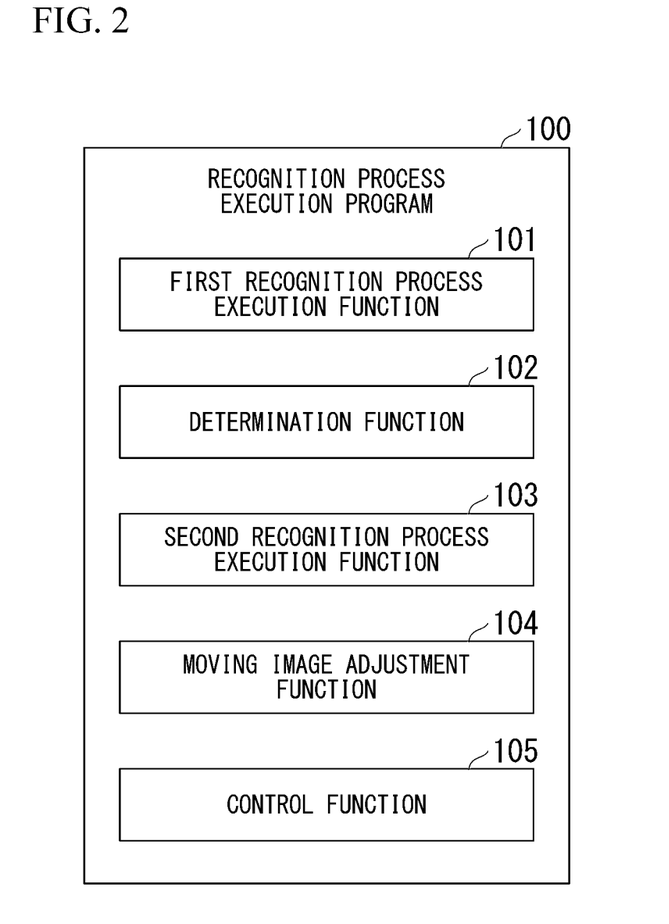
FIG. 2 is a diagram depicting an example of the functional configuration of a recognition process execution program according to an embodiment.

Next, the recognition process execution program according to an embodiment will be explained with reference to FIG. 2. FIG. 2 is a diagram depicting an example of the functional configuration of the recognition process execution program according to an embodiment. As depicted in FIG. 2, the recognition process execution program 100 is provided with a first recognition process execution function 101, a determination function 102, a second recognition process execution function 103, a moving image adjustment function 104, and a control function 105. These five functions are each implemented by the processor 11 reading out and executing the recognition process execution program 100 stored in the main storage device 12. Additionally, for example, in the case in which the recognition process execution device 10 is a drive recorder, these five functions may start running by being triggered by the starting of the engine of an automobile in which the drive recorder is mounted, and may stop running by being triggered by the stopping of the engine.

The first recognition process execution function 101 determines whether or not a first image constituting a moving image has been generated. The moving image is, for example, captured by the image capture device 20-1 or the image capture device 20-k depicted in FIG. 1. Additionally, the first image is captured by the image capture device 20-1 or the image capture device 20-k. Furthermore, the first image is indicated by first image data generated by the image capture device 20-1 or the image capture device 20-k.

Furthermore, the first recognition process execution function 101 acquires first image data and inputs the data to a first trained model each time a first image constituting the moving image is generated or at prescribed intervals. Thus, the first trained model executes a first recognition process for recognizing a target appearing in a first image and outputs target recognition results as well as first reliability data indicating the reliability of the results of the first recognition process.

The first trained model, for example, includes a convolutional neural network and executes object recognition or semantic segmentation as the first recognition process. Additionally, the first trained model, during the training phase, is trained based on teacher data in which the problems are first training image data indicating first training images and in which the answers are first training recognition data indicating the results of recognition, by a certain level of accuracy or higher, of targets appearing in the first training images. Specifically, the first trained model adjusts the magnitudes of weights of respective synapses so that the results of the first recognition process output based on the first training images approach, as closely as possible, the recognition process results indicated by the first training recognition data. Furthermore, the first trained model updates the weights of the respective synapses to adjusted weights of the respective synapses. The recognition accuracy can be sufficiently improved by repeating these operations a prescribed number of times.

The reliability indicated by the first reliability data, for example, in the case in which the first recognition process is object recognition, includes at least one of the reliability of labels appended to targets appearing in the images, and the reliability of the sizes and positions of first shapes designating targets appearing in the images. Additionally, the first shapes are, for example, bounding boxes. Alternatively, the reliability indicated by the first reliability data, in the case in which the first recognition process is semantic segmentation, includes at least one of the reliability of labels appended to respective regions and the reliability of the respective regions. In the case in which multiple items of first reliability data can be output, new first reliability data may be selectively or statistically calculated from the multiple items of first reliability data. Specifically, one or more items of first reliability data may be selected from among the multiple items of first reliability data and the new first reliability data may be calculated from the selected first reliability data. As another example, the new first reliability data may be calculated based on an average value, a median value, or a variance value of multiple items of first reliability data, or calculated based on a maximum value or a minimum value thereof.

Each time first reliability data is output, the determination function 102 determines whether or not the reliability indicated by the first reliability data is lower than a prescribed threshold value. This prescribed threshold value may be set to an arbitrary value. Additionally, the determination function 102 determines whether or not the number of times that the reliability indicated by the first reliability data has been determined to be lower than the prescribed threshold value is greater than a prescribed number of times since the moving image started. This prescribed number of times may be set to be an arbitrary number of times greater than or equal to 1.

If the reliability indicated by the first reliability data is determined to be lower than the prescribed threshold value more than the prescribed number of times, then the second recognition process execution function 103 acquires first image data or second image data and inputs the data to a second trained model. This prescribed number of times may be set to be an arbitrary number of times. Additionally, the counting of the number of times determined in this way may be started from the time at which the moving image started or may be started after a prescribed period of time has elapsed since the moving image started. The second image data is data indicating a second image different from the first image, for example, an image in which the resolution in the first image has been made higher. Additionally, the second image data may be generated by changing the conditions or the parameters when capturing the images by means of the image capture device 20-1, . . . , or the image capture device 20-k, which captured the first image, or may be generated by the second recognition process execution function 103. Additionally, although an image obtained by making the resolution of the first image higher was mentioned as an example of the second image data, the second image data is not limited thereto. For example, the second image data may indicate a second image with a data size larger than that of the first image data. For example, the second image data and the first image data may differ in terms of the bit accuracy, the compression rate, the compression scheme, the data format, or the like.

For example, if the reliability indicated by the first reliability data has been determined to be lower than the prescribed threshold value more than the prescribed number of times, then the second recognition process execution function 103 inputs the first image data to the second trained model, which is a trained model that is different from the first trained model. Additionally, in this case, the second trained model may be a trained model having a different network structure from the first trained model, or may be a trained model having the same network structure with at least some of the parameters being different from those in the first trained model.

Alternatively, if the reliability indicated by the first reliability data has been determined to be lower than the prescribed threshold value more than the prescribed number of times, then the second recognition process execution function 103 acquires the second image data and inputs the second image data to the second trained model, which is a trained model that is the same as the first trained model. Additionally, in this case, the second trained model is a trained model that is the same as the first trained model, not only in terms of the network structure, but also in terms of various parameters.

Alternatively, if the reliability indicated by the first reliability data has been determined to be lower than the prescribed threshold value more than the prescribed number of times, then the second recognition process execution function 103 acquires the second image data and inputs the second image data to the second trained model, which is a trained model that is different from the first trained model. Additionally, in this case, the second trained model may be a trained model having a different network structure from the first trained model, or may be a trained model having the same network structure with at least some of the parameters being different from those in the first trained model.

The second trained model, by having at least one of first image data and second image data input thereto, executes a second recognition process for recognizing a target appearing in the first image or in the second image, and outputs target recognition results as well as second reliability data indicating the reliability of the results of the second recognition process. Additionally, the second recognition process is a recognition process having a processing load greater than or equal to the processing load of the first recognition process. In this case, the processing load can be represented by the amount of computation or the number of computation steps that are necessary until prescribed output results are output with respect to the input data. Aside therefrom, the processing load may be represented by the processing time, the amount of power consumed, the necessary clock speed, the necessary number of processing cores, the number of times memory is accessed, the utilization rate of the CPU, or the like The second trained model, for example, includes a convolutional neural network and executes object recognition or semantic segmentation as the second recognition process. Additionally, the second trained model, during the training phase, is trained based on teacher data in which the problems are second training image data indicating second training images and in which the answers are second training recognition data indicating the results of recognition, by a certain level of accuracy or higher, of targets appearing in the second training images. Specifically, the second trained model adjusts the magnitudes of weights of respective synapses so that the results of the second recognition process output based on the second training images approach, as closely as possible, recognition process results indicated by the second training recognition data. Furthermore, the second trained model updates the weights of the respective synapses to adjusted weights of the respective synapses. The recognition accuracy can be sufficiently improved by repeating these operations a prescribed number of times.

The reliability indicated by the second reliability data, for example, in the case in which the second recognition process is object recognition, includes at least one of the reliability of labels appended to targets appearing in the second images, and the reliability of the sizes and positions of second shapes designating targets appearing in the second images. Additionally, the second shapes are, for example, bounding boxes. Alternatively, the reliability indicated by the second reliability data, in the case in which the second recognition process is semantic segmentation, includes at least one of the reliability of labels appended to respective regions and the reliability of the respective regions. In the case in which multiple items of second reliability data can be output, new second reliability data may be statistically calculated from the multiple items of second reliability data. Specifically, one or more items of second reliability data may be selected from among the multiple items of second reliability data and the new second reliability data may be calculated from the selected second reliability data. As another example, the new second reliability data may be calculated based on an average value, a median value, or a variance value of multiple items of second reliability data, or calculated based on a maximum value or a minimum value thereof.

If the reliability indicated by the first reliability data has been determined to be lower than the prescribed threshold value more than a prescribed number of times greater than or equal to 1, then the moving image adjustment function 104 executes a process for reducing the number of first images constituting the moving images per unit time. For example, in such a case, the moving image adjustment function 104 lowers the frame rate of the moving images by controlling at least one of the image capture device 20-1, . . . , or the image capture device 20-$k$. However, this process is not an essential process. Aside from lowering the frame rate, the control may also involve lowering the data rate by changing the sizes of output images or the number of channels in interfaces with the image capture devices, changing the compression rate, or the like. Additionally, the second images may be acquired by combining multiple first images. For example, by taking the arithmetic mean of two first images, the frame rate can be reduced by half while improving the image quality of input images.

Additionally, if the second recognition process execution function inputs second image data to the second trained model, then the first recognition process execution function 101 may acquire and input, to the first trained model, base image data indicating a base image that is the first image serving as a basis for generating the second image on which the second recognition process is executed. As a result thereof, the first trained model executes an additional recognition process by which a target appearing in the base image is recognized, and outputs additional reliability data indicating the reliability of the results of the additional recognition process. The additional recognition process is the same process as the first recognition process described above.

In this case, if the additional recognition process is executed, then the determination function 102 further determines whether or not the reliability indicated by the additional reliability data satisfies a prescribed condition each time the second reliability data and the additional reliability data are output, or at prescribed intervals. The prescribed condition is, for example, the condition that the difference between the reliability indicated by the second reliability data and the reliability indicated by the additional reliability data is lower than a prescribed threshold value. Furthermore, if the prescribed condition has been determined to be satisfied by the reliability indicated by the additional reliability data more than a prescribed number of times greater than or equal to 1 since the second recognition process and the additional recognition process started, then the second recognition process and the additional recognition process are stopped and the first recognition process is started. Since the additional recognition process is a process that requires the second image data, the additional recognition process is stopped simultaneously with the stopping of the second recognition process.

Although the threshold values for the reliability indicated by the first reliability data, the reliability indicated by the second reliability data, and the reliability indicated by the additional reliability data are each different from each other, the control may be implemented with any of the threshold values set to be the same. Additionally, the prescribed number of times that is used for determination is preferably changed each time in accordance with the conditions. For example, the threshold values may be provided with hysteresis in order to avoid frequent state transitions, and they are preferably controlled in accordance with environmental information such as the weather, the time, and the peripheral illuminance, physical quantities such as speed and acceleration, and the detection target in addition to the prescribed number of times.

Additionally, the data input aside from the above may be data combining data indicating measurement results in physical quantity measurement devices such as photosensors, thermometers, GPS (Global Positioning System) measurement devices, angular velocity measurement devices, wind meters, and the like that may be installed on an edge device. Additionally, the data may be a combination of different data such as data indicating base station information received from peripheral equipment via cable or wireless communication, data indicating information regarding vehicles, ships, and the like, data indicating weather information, data indicating peripheral information such as data indicating information relating to congestion conditions, data indicating financial information, data indicating personal information, or the like.

If the number of first images constituting the moving images per unit time is reduced and the reliability indicated by the additional reliability data has been determined to satisfy the prescribed condition more than the prescribed number of times equal to or greater than 1 since the second recognition process and the additional recognition process started, then the moving image adjustment function 104 increases the number of first images constituting the moving images per unit time. For example, in such a case, the moving image adjustment function 104 increases the frame rate of the moving images by controlling the image capture device 20-1, . . . , or the image capture device 20-k. However, this process is not an essential process.

Figure 3:
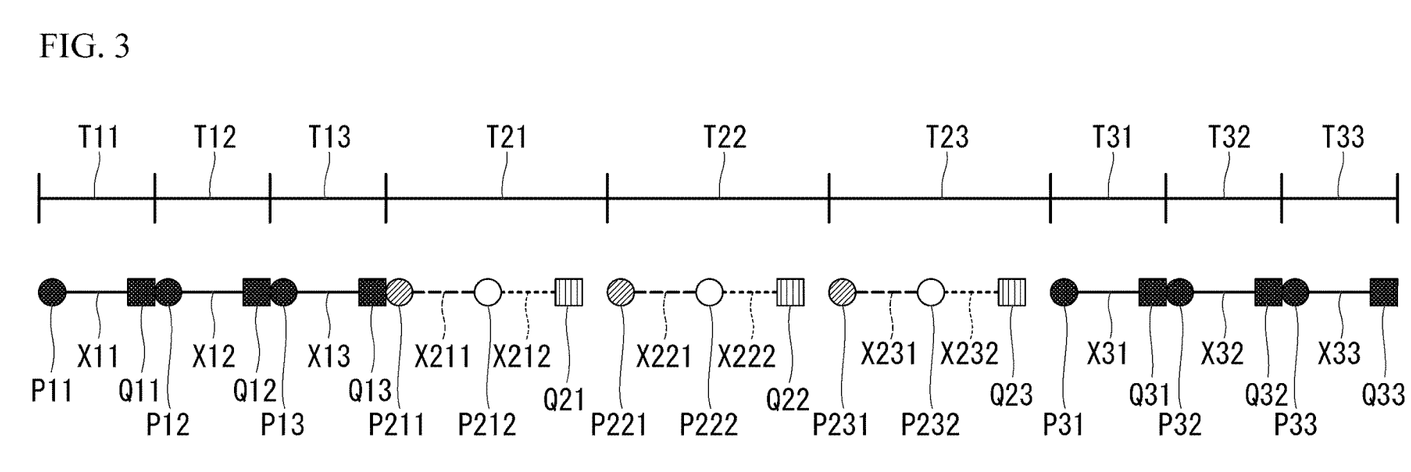
FIG. 3 is a diagram depicting an example for the case in which a recognition process execution program according to an embodiment runs on a drive recorder.

Next, an example of the case in which a recognition process execution program runs on a drive recorder in accordance with an embodiment will be explained with reference to FIG. 3. FIG. 3 is a diagram depicting an example of the case in which the recognition process execution program according to the embodiment runs on a drive recorder. The time period T11, the time period T12, the time period T13, the time period T21, the time period T22, the time period T23, the time period T31, the time period T32, and the time period T33 indicated in FIG. 3 are each unit time periods in which a single first image is acquired.

The time period T11, as indicated in FIG. 3, includes a timing indicated by the circle P11, a time period indicated by the solid line X11, and a timing indicated by the square Q11. Similarly, the time period T12 includes a timing indicated by the circle P12, a time period indicated by the solid line X12, and a timing indicated by the square Q12. Additionally, the time period T13 includes a timing indicated by the circle P13, a time period indicated by the solid line X13, and a timing indicated by the square Q13.

At the timing indicated by the circle P11, the timing indicated by the circle P12, and the timing indicated by the circle P13, the first recognition process execution function acquires first image data and inputs the data to the first trained model. Additionally, at the timing indicated by the circle P11, a count of the number of times that the reliability indicated by the first reliability data has been determined to be lower than the prescribed threshold value is started. During the time period indicated by the solid line X11, the time period indicated by the solid line X12, and the time period indicated by the solid line X13, the first trained model executes the first recognition process.

At the timing indicated by the square Q11, the timing indicated by the square Q12, and the timing indicated by the square Q13, the determination function 102 determines whether or not the reliability indicated by the first reliability data is lower than the prescribed threshold value, and furthermore, determines whether or not the number of times that the reliability indicated by the first reliability data has been determined to be lower than the prescribed threshold value is greater than the prescribed number of times since the moving image started.

Additionally, at the timing indicated by the square Q11 and the timing indicated by the square Q12, the determination function 102 determines that the number of times that the reliability indicated by the first reliability data has been determined to be lower than the prescribed threshold value is not greater than the prescribed number of times since the moving image started.

Conversely, at the timing indicated by the square Q13, the determination function 102 determines that the number of times that the reliability indicated by the first reliability data has been determined to be lower than the prescribed threshold value is greater than the prescribed number of times since the moving image started. Therefore, at the timing indicated by the square Q13, the control function 105 makes the second recognition process execution function start executing the second recognition process, makes the first recognition process execution function start executing the additional recognition process, and makes the first recognition process execution function stop executing the first recognition process.

The time period T21, as indicated in FIG. 3, includes a timing indicated by the circle P211, a time period indicated by the dashed line X211, a timing indicated by the circle P212, a time period indicated by the dotted line X212, and a timing indicated by the square Q21. Similarly, the time period T22 includes a timing indicated by the circle P221, a time period indicated by the dashed line X221, a timing indicated by the circle P222, a time period indicated by the dotted line X222, and a timing indicated by the square Q22. Additionally, the time period T23 includes a timing indicated by the circle P231, a time period indicated by the dashed line X231, a timing indicated by the circle P232, a time period indicated by the dotted line X232, and a timing indicated by the square Q23.

At the timing indicated by the circle P211, the timing indicated by the circle P221, and the timing indicated by the circle P231, the second recognition process execution function 103 acquires second image data and inputs the data to the second trained model. Additionally, at the timing indicated by the circle P211, a count of the number of times that the reliability indicated by the first reliability data has been determined to be lower than the prescribed threshold value is started. During the time period indicated by the dashed line X211, the time period indicated by the dashed line X221, and the time period indicated by the dashed line X231, the second trained model executes the second recognition process.

At the timing indicated by the circle P212, the timing indicated by the circle P222, and the timing indicated by the circle P232, the first recognition process execution function 101 acquires base image data and inputs the data to the first trained model. During the time period indicated by the dotted line X212, the time period indicated by the dotted line X222, and the time period indicated by the solid line X232, the first trained model executes the additional recognition process.

At the timing indicated by the square Q21, the timing indicated by the square Q22, and the timing indicated by the square Q23, the determination function 102 determines whether or not the reliability indicated by the additional reliability data satisfies the prescribed condition, and furthermore, determines whether or not the number of times that the reliability indicated by the additional reliability data has been determined to satisfy the prescribed condition is greater than the prescribed number of times since the second recognition process and the additional recognition process started.

Additionally, at the timing indicated by the square Q21 and the timing indicated by the square Q22, the determination function 102 determines that the number of times that the reliability indicated by the additional reliability data has been determined to satisfy the prescribed condition is not greater than the prescribed number of times since the second recognition process and the additional recognition process started.

Conversely, at the timing indicated by the square Q23, the determination function 102 determines that the number of times that the reliability indicated by the additional reliability data has been determined to satisfy the prescribed condition is greater than the prescribed number of times since the the second recognition process and the additional recognition process started. Therefore, at the timing indicated by the square Q23, the control function makes the second recognition process execution function 103 stop executing the second recognition process, makes the first recognition process execution function 101 stop executing the additional recognition process, and makes the first recognition process execution function 101 start executing the first recognition process.

In FIG. 3, an example of the case in which the additional recognition process is executed after the the second recognition process has been executed was given. However, there is no limitation thereto. At least part of the time period during which the second recognition process is being executed may overlap with at least part of the time period during which the additional recognition process is being executed. Additionally, in FIG. 3, an example of the case in which the timing at which the second image data is acquired and input to the second trained model is different from the timing at which the base image data is acquired and input to the first rained model was given. However, there is not limitation thereto. These two timings may be the same.

The time period T31, as indicated in FIG. 3, includes a timing indicated by the circle P31, a time period indicated by the solid line X31, and a timing indicated by the square Q31. Similarly, the time period T32 includes a timing indicated by the circle P32, a time period indicated by the solid line X32, and a timing indicated by the square Q32. Additionally, the time period T33 includes a timing indicated by the circle P33, a time period indicated by the solid line X33, and a timing indicated by the square Q33.

At the timing indicated by the circle P31, the timing indicated by the circle P32, and the timing indicated by the circle P33, the first recognition process execution function acquires first image data and inputs the data to the first trained model. Additionally, at the timing indicated by the circle P31, a count of the number of times that the reliability indicated by the first reliability data has been determined to be lower than the prescribed threshold value is started. During the time period indicated by the solid line X31, the time period indicated by the solid line X32, and the time period indicated by the solid line X33, the first trained model executes the first recognition process.

At the timing indicated by the square Q31, the timing indicated by the square Q32, and the timing indicated by the square Q33, the determination function 102 determines whether or not the reliability indicated by the first reliability data is lower than the prescribed threshold value, and furthermore, determines whether or not the number of times that the reliability indicated by the first reliability data has been determined to be lower than the prescribed threshold value is greater than the prescribed number of times since the moving image started.

Additionally, in the present embodiment, an example in which the execution of the second recognition process in the second recognition process execution function 103 requires a higher processing load than execution of the first recognition process in the first recognition process execution function 101 and the frame rate is lowered for that reason was given. However, there is no limitation thereto. For example, control may be implemented to increase the power consumption or the electric current consumption between the time period T21 and the time period T23, thereby temporarily raising the computation amount per unit time. When doing so, the necessary clock rate or the necessary number of cores may be increased, or the utilization rate of the CPU or the like may be increased.

Additionally, in FIG. 3, an example of operation in which the execution of the second recognition process by the second recognition process execution function 103 is successive to the execution of the first recognition process by the first recognition process execution function 101 was given. However, there is no limitation thereto. For example, control may be implemented so that, in the case in which the reliability indicated by the first reliability data is determined to be lower than the prescribed threshold value, the first image data is stored in the auxiliary storage device 14 or the like with a flag or the like appended thereto. Then, at a timing at which there is ample processing capacity in the processor 11, such as during a time period in which image capture is stopped, the first image data to which a flag or the like has been appended may be read out from the auxiliary storage device 14 and the second recognition process may be executed in the second recognition process execution function 103.

In this way, if the results from the first recognition process, in which the processing load is lower than that in the second recognition process, are of at least a certain level, then the recognition process execution program 100 can make the recognition process execution device 10 execute only first recognition processes for which the computational capacity or the like can be conserved. Then, by executing the second recognition process when sufficient reliability is not obtained by the first recognition process, the overall processing load can be reduced.

Figure 4:
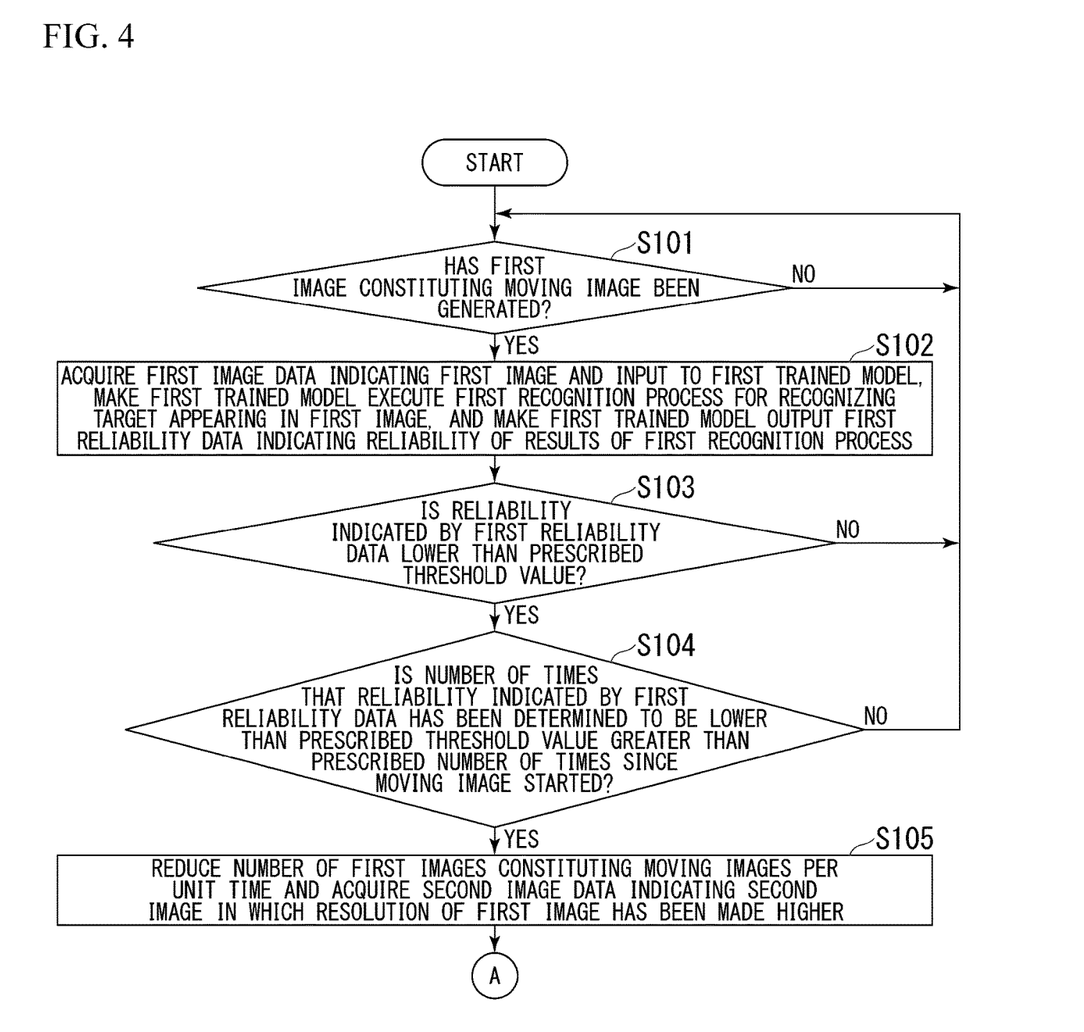
FIG. 4 is a flow chart indicating an example of the processes executed by a recognition process execution program according to an embodiment.
Figure 5:
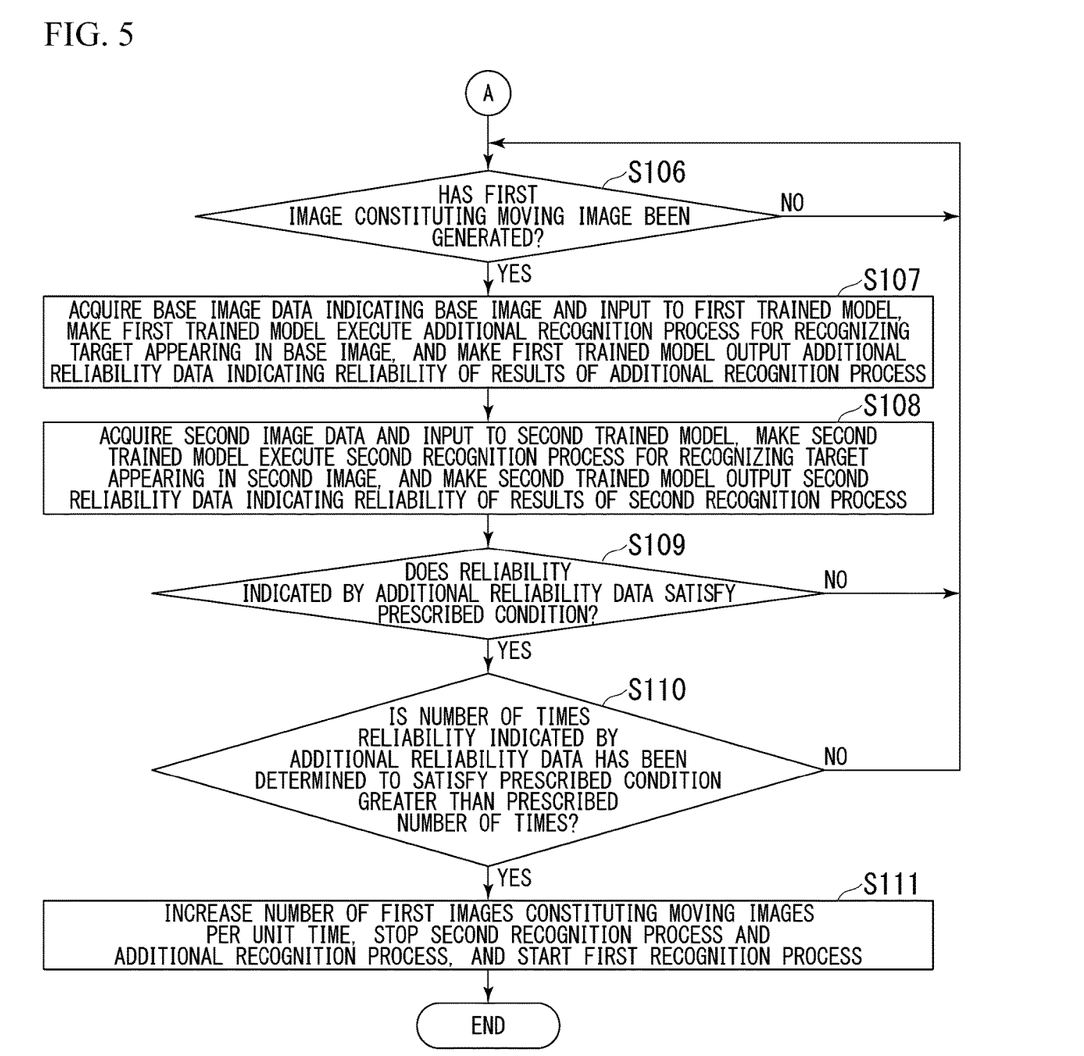
FIG. 5 is a flow chart indicating an example of the processes executed by a recognition process execution program according to an embodiment.

Next, an example of processes executed by the recognition process execution program 100 according to an embodiment will be explained with reference to FIGS. 4 and FIG.

5. FIG. 4 and FIG. 5 are flow charts indicating an example of the processes executed by the recognition process execution program according to an embodiment.

In step S101, the first recognition process execution function 101 determines whether or not a first image constituting a moving image has been generated. If the first recognition process execution function 101 determines that a first image constituting a moving image has been generated (step S101: YES), then the process advances to step S102. Conversely, if the first recognition process execution function 101 determines that a first image constituting a moving image has not been generated (step S101: NO), then a wait is implemented until a first image constituting a moving image is determined to have been generated.

In step S102, the first recognition process execution function 101 acquires first image data indicating the first image and inputs the data to a first trained model, makes the first trained model execute a first recognition process for recognizing a target appearing in the first image, and makes the first trained model output first reliability data indicating the reliability of the results of the first recognition process.

In step S103, the determination function 102 determines whether or not the reliability indicated by the first reliability data is lower than a prescribed threshold value. If the determination function 102 determines that the reliability indicated by the first reliability data is lower than the prescribed threshold value (step S103: YES), then the process advances to step S104. Conversely, if the determination function 102 determines that the reliability indicated by the first reliability data is equal to or higher than the prescribed threshold value (step S103: YES), then the process returns to step S101.

In step S104, the determination function 102 determines whether or not the number of times that the reliability indicated by the first reliability data has been determined to be lower than the prescribed threshold value is greater than a prescribed number of times since the moving image started. If the determination function 102 determines that the number of times that the reliability indicated by the first reliability data has been determined to be lower than the prescribed threshold value is greater than the prescribed number of times since the moving image started (step S104: YES), then the process advances to step S105. If the determination function 102 determines that the number of times that the reliability indicated by the first reliability data has been determined to be lower than the prescribed threshold value is less than or equal to the prescribed number of times since the moving image started (step S104: NO), then the process returns to step S101.

In step S105, the moving image adjustment function 104 reduces the number of first images constituting the moving images per unit time, and acquires second image data indicating a second image in which the resolution of the first image has been made higher.

In step S106, the first recognition process execution function 101 determines whether or not a first image constituting a moving image has been generated. If the first recognition process execution function 101 determines that a first image constituting a moving image has been generated (step S106: YES), then the process advances to step S107. Conversely, if the first recognition process execution function 101 determines that a first image constituting a moving image has not been generated (step S106: NO), then a wait is implemented until a first image constituting a moving image is determined to have been generated.

In step S107, the first recognition process execution function 101 acquires base image data indicating a base image and inputs the data to the first trained model, makes the first trained model execute an additional recognition process for recognizing a target appearing in the base image, and makes the first trained model output additional reliability data indicating the reliability of the results of the additional recognition process.

In step S108, the second recognition process execution function 103 acquires second image data and inputs the data to the second trained model, makes the second trained model execute a second recognition process for recognizing a target appearing in the second image, and makes the second trained model output second reliability data indicating the reliability of the results of the second recognition process.

In step S109, the determination function 102 determines whether or not the reliability indicated by the additional reliability data satisfies a prescribed condition. If the determination function 102 determines that the reliability indicated by the additional reliability data satisfies the prescribed condition (step S109: YES), then the process advances to step S110. Conversely, if the determination function 102 determines that the reliability indicated by the additional reliability data does not satisfy the prescribed condition (step S109: NO), then the process returns to step S106.

In step S110, the determination function 102 determines whether or not the number of times that the reliability indicated by the additional reliability data has been determined to satisfy the prescribed condition is greater than a prescribed number of times. If the determination function 102 determines that the number of times that the reliability indicated by the additional reliability data has been determined to satisfy the prescribed condition is greater than the prescribed number of times (step S110: YES), then the process advances to step S111. Conversely, if the determination function 102 determines that the number of times that the reliability indicated by the additional reliability data has been determined to satisfy the prescribed condition is less than or equal to the prescribed number of times (step S110: NO), then the process returns to step S106.

In step S111, the moving image adjustment function 104 increases the number of first images constituting the moving images per unit time, stops the second recognition process and the additional recognition process, and starts the first recognition process.

In step S109 and step S110 in FIG. 5, the determination may be made by using or by combining the second reliability data instead of the additional reliability data.

The recognition process execution program 100 according to an embodiment has been explained above. The recognition process execution program 100 is provided with a first recognition process execution function 101, a determination function 102, a second recognition process execution function 103, a moving image adjustment function 104, and a control function 105.

The first recognition process execution function 101, each time a first image constituting a moving image is generated or at prescribed intervals, acquires first image data indicating a first image and inputs the data to a first trained model, makes the first trained model execute a first recognition process for recognizing a target appearing in the first image, and makes the first trained model output first reliability data indicating the reliability of the results of the first recognition process. The determination function 102, each time first reliability data is output or at prescribed intervals, determines whether or not the reliability indicated by the first reliability data is lower than a prescribed threshold value.

If the reliability indicated by the first reliability data has been determined to be lower than the prescribed threshold value more than a prescribed number of times, then the second recognition process execution function 103 acquires first image data or second image data and inputs the data to a second trained model. Thus, the second recognition process execution function 103 makes the second trained model execute a second recognition process, having a processing load greater than or equal to the processing load of the first recognition process, for recognizing the target appearing in the first image and the second image, and makes the second trained model output second reliability data indicating the reliability of the results of the second recognition process. If the prescribed number of times is greater than 1 for either the first reliability data or the second reliability data, then the determination may be made based on whether or not the prescribed number of times has been exceeded within a prescribed time period rather than by being summed since the moving image started.

In other words, the recognition process execution program 100 executes the second recognition process only in the case in which the results from the first recognition process do not at least reach a certain standard and there is a need for a second recognition process with a higher processing load than that of the fist recognition process. Therefore, the recognition process execution program 100 can make an embedded device execute higher level processes even with limited performance provided in the recognition process execution device 10.

Additionally, if the reliability indicated by the first reliability data has been determined to be lower than the prescribed threshold value more than the prescribed number of times, then the recognition process execution program 100 inputs the first image data to the second trained model, which is a trained model different from the first trained model.

Thus, the recognition process execution program 100 can execute the second recognition process even with limited performance provided in the recognition process execution device 10, even if the second image data cannot be acquired due to reasons such as not being able to control the image capture device 20-1, ..., or the image capture device 20-k that captured the first image, or the like.

Additionally, if the reliability indicated by the first reliability data has been determined to be lower than the prescribed threshold value more than the prescribed number of times, then the recognition process execution program 100 acquires the second image data and inputs the second image data to the second trained model, which is a trained model that is the same as the first trained model.

Thus, the recognition process execution program 100 can execute the second recognition process, which has a higher processing load than the first recognition process, even if a second trained model different from the first trained model cannot be implemented due to the performance of the recognition process execution device 10 being limited.

Additionally, if the reliability indicated by the first reliability data is determined to be lower than the prescribed threshold value more than the prescribed number of times, then the recognition process execution program 100 acquires the second image data and inputs the second image data to the second trained model, which is a trained model that is different from the first trained model.

Thus, the recognition process execution program 100 can execute a recognition process with higher accuracy by using the second image, in which the resolution of the first image has been made higher, and the second trained model, which can execute a recognition process with higher accuracy than the first trained model.

Additionally, if the second recognition process execution function has input the second image data to the second trained model, the recognition process execution program 100 acquires and inputs, to the first trained model, base image data indicating a base image, which is the first image serving as a basis for generating the second image on which the second recognition process is executed. Next, the recognition process execution program 100 makes the first trained model execute an additional recognition process for recognizing a target appearing in the base image, and makes the first trained model output additional reliability data indicating the reliability of the results of the additional recognition process. Furthermore, if the reliability indicated by the additional reliability data has been determined to satisfy a prescribed condition more than a prescribed number of times since the second recognition process and the additional recognition process started, then the recognition process execution program 100 stops the second recognition process and the additional recognition process, and starts the first recognition process.

Thus, if the results of the additional recognition process, which has a processing load lower than that of the second recognition process and which is the same process as the first recognition process, are of a certain level or higher, then the recognition process execution program 100 can make the recognition process execution device 10 execute only the first recognition process, by which the computational capacity or the like can be easily conserved.

Additionally, if the reliability indicated by the first reliability data has been determined to be lower than the prescribed threshold value more than a prescribed number of times, then the recognition process execution program 100 reduces the number of first images constituting the moving images per unit time.

Thus, the recognition process execution program 100 can make the recognition process execution device 10 conserve computational capacity, allowing the above-mentioned effects to be even more easily obtained.

Additionally, if the number of first images constituting the moving images per unit time is reduced and the reliability indicated by the additional reliability data has been determined to satisfy the prescribed condition more than the prescribed number of times since the second recognition process and the additional recognition process started, then the recognition process execution program 100 increases the number of first images constituting the moving images per unit time.

Thus, when there is no longer a need to execute the second recognition process and there is ample computational capacity or the like in the recognition process execution device 10, the recognition process execution program 100 can increase the number of first images constituting the moving images per unit time and can improve the real-time performance of the recognition process execution device 10.

Additionally, the recognition process execution program 100 determines whether or not the difference between the reliability indicated by the second reliability data and the reliability indicated by the additional reliability data is less than a prescribed threshold value. Furthermore, if the difference between the reliability indicated by the second reliability data and the reliability indicated by the additional reliability data is less than a prescribed threshold value, then the recognition process execution program 100 stops the second recognition process and the additional recognition process, and starts the first recognition process.

Thus, the recognition process execution program 100 can make an embedded device execute only the first recognition process, by which the computational capacity or the like can be easily conserved, after confirming that the reliability of the first recognition process, which tends to have lower reliability than the second recognition process, exceeds a certain standard and approaches the reliability of the second recognition process.

Additionally, the recognition process execution program 100 makes the first trained model output first reliability data indicating at least one of the reliability of a label appended to a target appearing in the first image, and the reliability of the size and the position of a first shape designating the target appearing in the first image. Furthermore, the recognition process execution program 100 makes the second trained model output second reliability data indicating at least one of the reliability of a label appended to a target appearing in the second image, and the reliability of the size and the position of a second shape designating the target appearing in the second image.

Thus, the recognition process execution program 100 can provide the above-mentioned effects regarding the reliability associated with matters of particular importance in the first recognition process and the second recognition process.

In the above-mentioned embodiments, an example of the case in which the recognition process execution program 100 executes the above-mentioned process for the entirety of each first image constituting a moving image was explained. However, there is no limitation thereto. The recognition process execution program 100 may execute the above-mentioned process by recognizing, as the above-mentioned first image, just a specific region in each first image constituting a moving image. In this case, the recognition process execution program 100 only needs to execute the above-mentioned process for part of each first image constituting the moving image, and thus, the computational capacity or the like in the recognition process execution device 10 can be conserved.

Additionally, the data input to the recognition process execution device 10 described in the above-mentioned embodiments is not limited to being in a single format, and may be constituted by still images, moving images, audio, text, numerals, and combinations thereof.

Additionally, at least some of the functions of the recognition process execution program 100 may be realized by hardware including circuitry such as an LSI (Large-Scale Integration), an ASIC (Application-Specific Integrated Circuit), an FPGA (Field-Programmable Gate Array), and a GPU (Graphics Processing Unit).

Additionally, at least some of the functions provided in the recognition process execution device 10 in the above-mentioned embodiment may be implemented by recording a program for implementing these functions on a computer-readable recording medium, and having a computer system read and execute the program recorded on this recording medium. The computer system mentioned here includes an OS and hardware such as peripheral devices.

Additionally, the computer-readable recording medium refers to a portable medium such as a flexible disk, a magneto-optic disk, a ROM, or a CD-ROM, or a storage unit, such as a hard disk, internal to the computer system. Furthermore, the computer-readable recoding medium may include media that dynamically hold the program for a short time, such as communication cables in the case in which the program is transmitted via a network such as the internet or via a communication line such as a telephone line, and also media that hold the program for a certain period of time such as transitory memory inside a computer system serving as a server or a client in such a case. Additionally, the above-mentioned program may be for implementing just some of the above-mentioned functions, and furthermore, may be capable of implementing the above-mentioned functions by being combined with a program already recorded in a computer system.

Embodiments of the present invention have been explained in detail above with reference to the drawings. However, the specific configurations of the embodiments of the present invention are not limited to the above-mentioned embodiments, and at least one of various combinations, modifications, substitutions, and design changes may be added to the above-mentioned embodiments within a range not departing from the spirit of the present invention.

REFERENCE SIGNS LIST

1 Recognition process execution system
10 Recognition process execution device
11 Processor
12 Main storage device
13 Communication interface
14 Auxiliary storage device
15 Input/output device
20-1, . . . , 20-$k$ Image capture device
30 Server
31 Processor
32 Main storage device
33 Communication interface
34 Auxiliary storage device
40 Storage device
NW Network
100 Recognition process execution program
101 First recognition process execution function
102 Determination function
103 Second recognition process execution function
104 Moving image adjustment function
105 Control function

The invention claimed is:

1. A processor that makes a computer implement:
a first recognition process execution function for inputting first image data indicating a first image to a first trained model, making the first trained model execute a first recognition process for recognizing a target appearing in the first image, and making the first trained model output first reliability data indicating a reliability of a result of the first recognition process;
a determination function for determining a reliability indicated by the first reliability data; and
a second recognition process execution function for, based on a determination result by the determination function, inputting second image data indicating a second image different from the first image data to a second trained model, and making the second trained model execute a second recognition process, having a processing load greater than or equal to a processing load of the first recognition process, for recognizing the target appearing in the first image and the second image,
wherein the first reliability data includes at least one of a reliability of a label appended to the target appearing in the first image, and a reliability of a size and a position of a bounding box designating the target appearing in the first image.

2. The processor according to claim 1, wherein:
if the determination function determines that the reliability indicated by the first reliability data is lower than a prescribed threshold value, then the second recognition process execution function inputs, to the second trained model, the second image data indicating the second image, in which the resolution of the first image has been made higher.

3. The processor according to claim 1, wherein:
the first recognition process execution function inputs multiple items of the first image data to the first trained model, makes the first trained model execute the first recognition process, and makes the first trained model output the first reliability data; and
the determination function determines, regarding the first reliability data that is output, whether or not the reliability indicated by the first reliability data is lower than a prescribed threshold value.

4. The processor according to claim 1, wherein:
if the determination function has determined that the reliability indicated by the first reliability data is lower than a prescribed threshold value more than a prescribed number of times, then the second recognition process execution function inputs the first image data to the second trained model, which is a trained model different from the first trained model.

5. The processor according to claim 1, wherein:
if the determination function has determined that the reliability indicated by the first reliability data is lower than a prescribed threshold value more than a prescribed number of times, then the second recognition process execution function inputs the second image data to the second trained model, which is a trained model that is the same as the first trained model.

6. The processor according to claim 1, wherein:
if the determination function has determined that the reliability indicated by the first reliability data is lower than a prescribed threshold value more than a prescribed number of times, then the second recognition process execution function inputs the second image data to the second trained model, which is a trained model different from the first trained model.

7. The processor according to claim 1, wherein:
if the determination function has determined that the reliability indicated by the first reliability data is lower than a prescribed threshold value more than a prescribed number of times, then the computer is further made to implement a moving image adjustment function for reducing a number of the first images per unit time.

8. The processor according to claim 1, wherein:
if the second recognition process execution function inputs the second image data to the second trained model, then the first recognition process execution function acquires and inputs, to the first trained model, base image data indicating a base image that is the first image serving as a basis for generating the second image on which the second recognition process is executed, makes the first trained model execute an additional recognition process for recognizing the target appearing in the base image, and makes the first trained model output additional reliability data indicating a reliability of a result of the additional recognition process;
the determination function further determines, regarding the additional reliability data that is output, whether or not a reliability indicated by the additional reliability data satisfies a prescribed condition; and
the computer is further made to execute a control function for stopping the second recognition process and the additional recognition process, and starting the first recognition process, if the reliability indicated by the additional reliability data has been determined to satisfy the prescribed condition more than a prescribed number of times since the second recognition process and the additional recognition process started.

9. The processor according to claim 8, wherein:
the computer is further made to implement a moving image adjustment function for reducing a number of the first images per unit time if the determination function has determined that the reliability indicated by the first reliability data is lower than a prescribed threshold value more than a prescribed number of times.

10. The processor according to claim 9, wherein:
if the number of the first images per unit time is reduced and the reliability indicated by the additional reliability data has been determined to satisfy the prescribed condition more than a prescribed number of times since the second recognition process and the additional recognition process started, then the moving image adjustment function increases the number of the first images per unit time.

11. The processor according to claim 8, wherein:
the second recognition process execution function makes the second trained model output second reliability data indicating a reliability of a result of the second recognition process; and
the determination function determines whether or not a difference between the reliability indicated by the second reliability data and the reliability indicated by the additional reliability data is less than a prescribed threshold value.

12. The processor according to claim 1, wherein:
the first recognition process execution function makes the first trained model output the first reliability data indicating at least one of a reliability of a label appended to the target appearing in the first image, and a reliability of a size and a position of a first shape designating the target appearing in the first image.

13. A recognition process execution device comprising a processor configured to execute a program to:
input first image data indicating a first image to a first trained model, make the first trained model execute a first recognition process for recognizing a target appearing in the first image, and make the first trained model output first reliability data indicating a reliability of a result of the first recognition process;
determine a reliability indicated by the first reliability data; and
input second image data indicating a second image different from the first image data to a second trained model, and make the second trained model execute a second recognition process, having a processing load greater than or equal to a processing load of the first recognition process, for recognizing the target appearing in the first image and the second image,
wherein the first reliability data includes at least one of a reliability of a label appended to the target appearing in the first image, and a reliability of a size and a position of a bounding box designating the target appearing in the first image.

* * * * *